(12) United States Patent
Gunther et al.

(10) Patent No.: US 10,613,610 B2
(45) Date of Patent: *Apr. 7, 2020

(54) INDEPENDENT POWER CONTROL OF PROCESSING CORES

(71) Applicant: Intel Corporation, Santa Clara, CA (US)

(72) Inventors: Stephen H. Gunther, Beaverton, OR (US); Edward A. Burton, Hillsboro, OR (US); Anant Deval, Beaverton, OR (US); Stephan Jourdan, Portland, OR (US); Robert Greiner, Beaverton, OR (US); Michael Cornaby, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 15/951,290

(22) Filed: Apr. 12, 2018

(65) Prior Publication Data

US 2018/0232039 A1  Aug. 16, 2018

Related U.S. Application Data

(63) Continuation of application No. 15/800,144, filed on Nov. 1, 2017, now Pat. No. 10,095,300, which is a (Continued)

(51) Int. Cl.
*G06F 1/32* (2019.01)
*G06F 1/3234* (2019.01)
(Continued)

(52) U.S. Cl.
CPC .......... *G06F 1/3234* (2013.01); *G06F 1/3203* (2013.01); *G06F 1/324* (2013.01); *G06F 1/3287* (2013.01); *G06F 1/3296* (2013.01)

(58) Field of Classification Search
CPC ........ G06F 1/3202; G06F 1/3231; G06F 1/26; G06F 1/206; G06F 1/3228
See application file for complete search history.

(56) References Cited

U.S. PATENT DOCUMENTS

| 5,392,437 A | 2/1995 | Matter et al. |
| 5,502,838 A | 3/1996 | Kikinis |

(Continued)

FOREIGN PATENT DOCUMENTS

| CN | 1877492 A | 6/2005 |
| CN | 1641534 | 7/2005 |

(Continued)

OTHER PUBLICATIONS

Donald, et al., "Techniques for Multicore Thermal Management: Classification and New Exploration," Proceedings of the 33rd International Symposium on Computer Architecture (ISCA'06), US, IEEE Computer Society, Jun. 17-21, 2006, pp. 78-88.

(Continued)

*Primary Examiner* — Zahid Choudhury
(74) *Attorney, Agent, or Firm* — Trop, Pruner & Hu, P.C.

(57) ABSTRACT

Independent power control of two or more processing cores. More particularly, at least one embodiment of the invention pertains to a technique to place at least one processing core in a power state without coordinating with the power state of one or more other processing cores.

20 Claims, 5 Drawing Sheets

Related U.S. Application Data continuation of application No. 14/689,175, filed on Apr. 17, 2015, now Pat. No. 9,841,803, which is a continuation of application No. 12/899,311, filed on Oct. 6, 2010, now Pat. No. 9,037,885, which is a continuation of application No. 11/555,609, filed on Nov. 1, 2006, now Pat. No. 7,949,887.

(51) Int. Cl.
| | |
|---|---|
| *G06F 1/3203* | (2019.01) |
| *G06F 1/324* | (2019.01) |
| *G06F 1/3287* | (2019.01) |
| *G06F 1/3296* | (2019.01) |

(56) References Cited

U.S. PATENT DOCUMENTS

| | | | |
|---|---|---|---|
| 5,913,068 | A | 6/1999 | Matoba |
| 6,141,762 | A | 10/2000 | Nicol et al. |
| 6,625,740 | B1 | 9/2003 | Datar et al. |
| 6,804,632 | B2 | 10/2004 | Orenstien et al. |
| 6,983,389 | B1 | 1/2006 | Filippo |
| 7,263,457 | B2 | 8/2007 | White et al. |
| 7,337,334 | B2 | 2/2008 | Kuhlmann et al. |
| 7,536,597 | B2 | 5/2009 | McGowan |
| 7,596,430 | B2 | 9/2009 | Aguilar, Jr. et al. |
| 7,647,452 | B1 | 1/2010 | Moll et al. |
| 7,664,971 | B2 | 2/2010 | Oh |
| 8,037,893 | B2 * | 10/2011 | Aguilar, Jr. ............... G06F 8/45 137/12 |
| 2002/0116650 | A1 | 8/2002 | Halepete et al. |
| 2003/0110012 | A1 | 6/2003 | Orenstien et al. |
| 2003/0122429 | A1 | 7/2003 | Zhang et al. |
| 2003/0135768 | A1 | 7/2003 | Knee et al. |
| 2003/0210274 | A1 | 11/2003 | Subramanian et al. |
| 2004/0098631 | A1 | 5/2004 | Terrell |
| 2004/0117678 | A1 | 6/2004 | Soltis, Jr. et al. |
| 2005/0154931 | A1 | 7/2005 | Oh |
| 2005/0162188 | A1 | 7/2005 | Newman |
| 2005/0289365 | A1 | 12/2005 | Bhandarkar |
| 2006/0020836 | A1 | 1/2006 | Tschanz et al. |
| 2006/0053326 | A1 | 3/2006 | Naveh et al. |
| 2007/0033425 | A1 | 2/2007 | Clark |
| 2007/0043964 | A1 | 2/2007 | Lim et al. |
| 2007/0255929 | A1 | 11/2007 | Kasahara et al. |
| 2008/0104425 | A1 | 5/2008 | Gunther et al. |
| 2008/0229128 | A1 | 9/2008 | Heller et al. |
| 2009/0313489 | A1 | 12/2009 | Gunther et al. |
| 2010/0011233 | A1 | 1/2010 | Halepete et al. |
| 2011/0296208 | A1 | 12/2011 | Koniaris et al. |

FOREIGN PATENT DOCUMENTS

| | | |
|---|---|---|
| EP | 1555595 | 7/2005 |
| EP | 1736851 | 12/2006 |
| GB | 2444597 | 6/2008 |
| JP | S64-48119 | 2/1989 |
| JP | 10222256 | 8/1998 |
| JP | 2006-293768 | 10/2006 |
| JP | 2008117397 | 5/2008 |
| KR | 20050073976 | 7/2005 |
| WO | WO-2003027820 | 4/2003 |
| WO | WO-2006019973 | 2/2006 |
| WO | WO-2007019003 | 2/2007 |
| WO | WO-2007038529 | 4/2007 |
| WO | WO-2007081466 | 7/2007 |

OTHER PUBLICATIONS

State Intellectual Property Office of the People's Republic of China, Second Office Action dated Jun. 15, 2011, in Chinese Patent Application No. 200710165766.5.

State Intellectual Property Office of the People's Republic of China, Second Office Action dated Nov. 19, 2014, in Chinese Patent Application No. 201210041653.5.

State Intellectual Property Office of the People's Republic of China, Third Office Action dated Jun. 25, 2015, in Chinese Patent Application No. 201210041653.5.

German Patent arid Trademark Office, Examination Request dated Feb. 11, 2011, in German Patent Application No. 102007051841.4.

German Patent and Trademark Office, Examination Request dated Mar. 13, 2012, in German Patent Application No. 102007051841.4.

German Patent and Trademark Office, Examination Request dated Dec. 19, 2012, in German Patent Application No. 102007051841.4.

Japan Patent Office, Summary of Appeal Decision dated May 22, 2012, in Japanese Patent Application No. 2007-281947.

Japan Patent Office, Decision of Court dated Jun. 12, 2013, in Japanese Patent Application No. 2007-281947.

Korea Intellectual Property Office, Notice of Preliminary Rejection dated Nov. 16, 2012, in Korean Patent Application No. 10-2010-55781.

Office Action from Japanese Patent Application No. 2007-281947 dated Jul. 12, 2011, 6 pages.

Notice of Allowance for U.S. Appl. No. 12/545,657, dated Jul. 21, 2011, 12 pages.

Notice of Allowance for U.S. Appl. No. 11/555,609 dated Mar. 14, 2011, 6 pages.

Notice of Allowance for U.S. Appl. No. 11/555,609 dated Jan. 12, 2011, 12 pages.

Non-Final Office Action for U.S. Appl. No. 11/555,609 dated Jul. 10, 2009, 13 pages.

Final Office Action for U.S. Appl. No. 11/555,609 dated Jun. 24, 2010, 19 pages.

Non-Final Office Action for U.S. Appl. No. 12/545,657 dated Jan. 3, 2011, 15 pages.

Examination Report for United Kingdom Patent Application No. GB0721314.3 dated Apr. 14, 2010, 3 pgs.

Office Action for Chinese Patent Application No. 2007/10165766.5 dated Mar. 10, 2010, 41 pgs.

Office Action for Korean Patent Application No. 10-2007-111212 dated Jul. 31, 2009, 9 pgs.

Final Office Action for Korean Patent Application No. 10-2007-111212 dated Feb. 11, 2010, 3 pgs.

Office Action for Japanese Patent Application No. 2007-281947 dated Dec. 15, 2009, 1 pg.

Search Report for United Kingdom Patent Application No. 0721314.3 dated Apr. 7, 2008, 6 pgs.

Examination Report for United Kingdom Patent Application No. GB 0721314.3 dated Jun. 23, 2009, 5 pgs.

U.S. Appl. No. 15/951,299, filed Apr. 12, 2018, entitled "Independent Power Control of Processing Cores", by Stephen H. Gunther, et al.

U.S. Appl. No. 15/951,310, filed Apr. 12, 2018, entitled "Independent Power Control of Processing Cores", by Stephen H. Gunther, et al.

Reply to Office Action dated Aug. 7, 2019 filed Nov. 5, 2019 in U.S. Appl. No. 15/951,299, 9 pages.

U.S. Patent and Trademark Office, Office Action dated Aug. 7, 2019 in U.S. Appl. No. 15/951,299, 46 pages.

U.S. Patent and Trademark Office, Office Action dated May 30, 2019 in U.S. Appl. No. 15/951,310 and Reply to Office Action filed Aug. 22, 2019, 46 pages.

U.S. Patent and Trademark Office, Notice of Allowance dated Sep. 6, 2019 in U.S. Appl. No. 15/951,310, 7 pages.

\* cited by examiner

INDEPENDENT POWER CONTROL OF PROCESSING CORES

PRIORITY

This application is a continuation of U.S. patent application Ser. No. 15/800,144, filed Nov. 1, 2017, which is a continuation of U.S. patent application Ser. No. 14/689,175, filed Apr. 17, 2015, now U.S. Pat. No. 9,841,803, issued Dec. 12, 2017, which is a continuation of U.S. patent application Ser. No. 12/899,311, filed Oct. 6, 2010, now U.S. Pat. No. 9,037,885, issued May 19, 2015, which is a continuation of Ser. No. 11/555,609, filed Nov. 1, 2006, now U.S. Pat. No. 7,949,887, issued May 24, 2011, the content of which is hereby incorporated by reference.

BACKGROUND

1. Field

The present disclosure pertains to the field of computing and computer systems, and, more specifically, to the field of power control of microprocessors.

2. Background

Some computing systems and microprocessors may contain multiple processing elements, or "cores", to execute instructions of a program and perform some function in response thereto. For example, multiple processing cores may exist on the same processor die. Alternatively or conjunctively, some computer systems may include multiple processors, each having one or more processing cores. Moreover, some computing systems and microprocessors may be able to control power consumption of one or more processing cores by placing the cores in various power states, which may be defined according to a power specification, such as ACPI (defined) or some other specification.

However, processing systems and microprocessors may not be able to control the power states of each processing core independently, but must coordinate a power state changes among the various cores present in the system or processor by using such techniques as polling the power state of other processing cores or otherwise detecting the power state of other cores in some way. Accordingly, the power states of a processing core may be dependent upon at least one other processing core in a computing system or processor.

Because some processing systems or processors may rely on the processing states of one or more cores to control the processing state of a particular core, the system or processor may require additional control circuitry to change a core's power state. Furthermore, polling or otherwise detecting power states of other processing cores before being able to change the power state of a particular processing core may require additional time before the core's processor state may be changed, which can degrade processing performance. Ironically, the additional circuitry needed to coordinate a power state change of a processing core with one or more other processing cores may cause the processor or system to draw more power, thereby at least partially offsetting the power consumption reduction of reducing a power state change intended to conserve power.

BRIEF DESCRIPTION OF THE FIGURES

The present invention is illustrated by way of example and not limitation in the accompanying figures.

DETAILED DESCRIPTION

Figure 1:
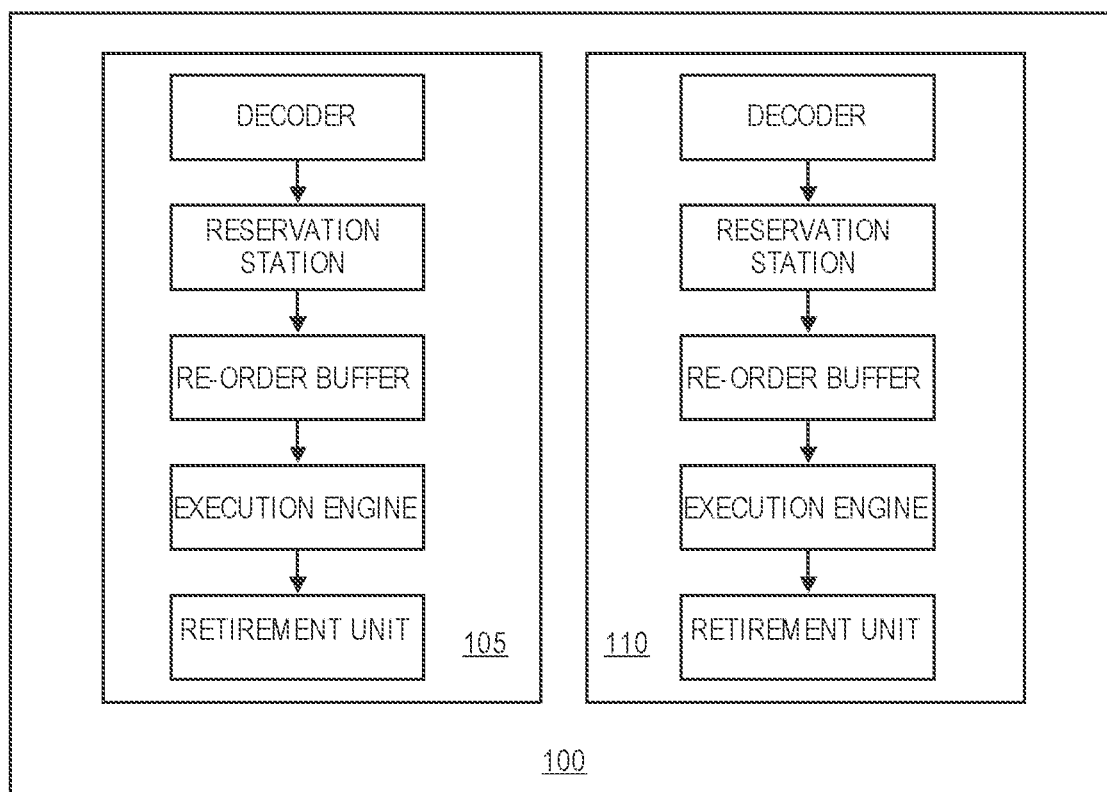
FIG. 1 illustrates a multi-core processor, in which at least one embodiment of the invention may be used.

Embodiments of the invention relate to computer systems. More particularly, some embodiments of the invention relate to a technique to control power consumption of two or more processing cores or portions of cores independently of each other. At least one embodiment of the invention enables at least one processing core to enter a number of power states without consideration to the power state at least one other processing core within the same processor or computing system. At least one embodiment, enables independent power control of circuits or functional blocks within one or more cores.

At least one embodiment of the invention may control power consumption of one or more cores by adjusting one or more clocks and/or operating voltages used by the core. For example, one embodiment may use control logic to enable or disable, voltage transformers, charge pumps, or some other voltage altering mechanism to control the voltage to one or more portions of a processor or processing core. Alternatively or conjunctively, one embodiment may use control logic to enable or disable one or more phase lock loops (PLLs), clock dividers, or some other clock gating mechanism to control the frequency, phase, duration, etc., of one or more clock signals used to operate one or more portions of a processor or processing core.

Moreover, power consumption of processing components, such as a processor or core, may be controlled according to a specification, so that an operating system or other software or hardware may place the component into one or more power states, such that the difference, ratio, or range of power consumption change may be known in relation to other power consumption states. One such specification is the ACPI power specification, which, among other things, may define a number of component power states (or "c states") according to a range by which power consumed by the component is to change in relation to the other component power states by placing the component in a particular power state. A component, such as a processing core, may be capable of supporting several ranges of power consumption defined by a specification by adjusting the clocks, operating voltage, or both.

In the case of ACPI, for example, a processing core, according to one embodiment, may support the ability to enter a "c3" state, in which the operating voltage of a core or processor is reduced to the minimum level required to retain state, rather than change output data, while the operating voltage. In other embodiments, other power states may be supported by a processor and/or core, either included in the ACPI specification or in some other specification.

At least one embodiment of the invention may place a processor or processing core into a particular power state (defined by ACPI or otherwise) without regard to and without first coordinating with another processor or core within the same system or die. Advantageously, embodiments of the invention may enjoy greater power control flexibilty, while reducing the time and/or logic necessary to change a processor or core power state, than in some of the prior art.

FIG. 1 illustrates a multi-core processor, in which at least one embodiment of the invention may be used. Specifically, FIG. 1 illustrates a processor 100 having processing cores 105 and 110 integrated within the same die. In other embodiments, the cores may be on separate die or may be in separate processors. Furthermore, embodiments of the invention may also be applied to processors or systems having more than two cores or processors. The exact arrangement or configuration of the cores in FIG. 1 are not important to embodiments of the invention. In some embodiments, numerous cores may be arranged in other configurations, such as a ring. Located within each core of FIG. 1 is a power controller to control the power consumed by the respective core. In other embodiments, each core's power may be controlled by logic (software, hardware, or both) located elsewhere, including outside of the processor.

Illustrated within the cores of FIG. 1 are pipeline stages for processing instructions. In other embodiments, other logic may be found within the cores. In one embodiment, the cores are out-of-order execution cores, whereas in other embodiments, they may process instructions in-order. Furthermore, in other embodiments, the cores may be of different types with different logic located within.

Figure 2:
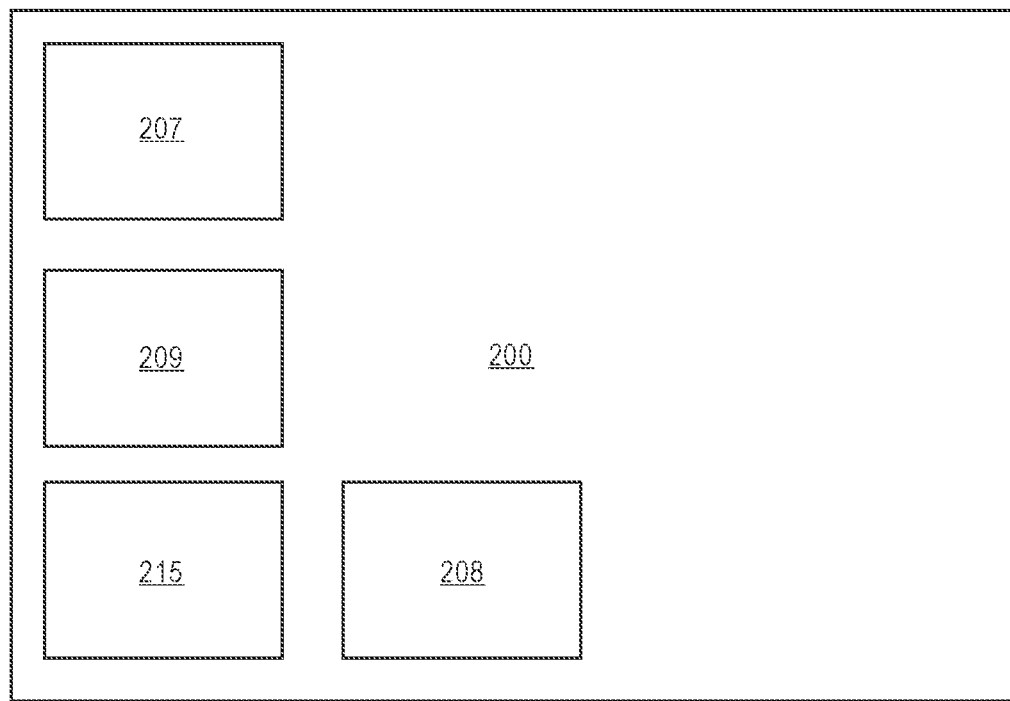
FIG. 2 illustrates a processor core and uncore logic in which one embodiment of the invention may be used.

FIG. 2 illustrates a processor core, in which at least one embodiment may be used. The processor core 200 illustrated in FIG. 1 may include one or more output circuits 207 to drive data onto one or more buses connected to either or both cores, such that data can be delivered to other circuits, devices, or logic within the processor or outside of the processor. Also located within, or otherwise associated with, each processor core of FIG. 1 is one or more power circuits 208 to reduce or increase the operating voltage of one or more portions of the core, as well as one or more clock modification circuits 209, such as one or more PLLs, to modify one or more clock signal frequencies, phases, work cycles, etc. In one embodiment, the one or more power circuits may include a number of transistors to implement a voltage divide circuit. The power circuits may use other devices or circuits to reduce or increase power to the cores, including charge pumps, voltage transformer circuits, etc.

In one embodiment, the core of FIG. 2 may have its power consumption adjusted according to various power states through power control logic 215. In one embodiment, the power control logic can respond to activity levels of each core independently of one another to adjust the voltage and/or the clock(s) used by each core, without coordinating, or otherwise detecting, the power states of the other core(s). For example, in one embodiment, the power control logic may detect a change in the work load or activities, or receive a signal from a detection circuit to detect the change in work load or activity, of a corresponding core and adjust either the voltage (via the power circuits) or one or more clocks (via the clock modification circuits) or both to put the core into a power state that best matches the requirements of the activity level or load. Furthermore, in one embodiment, the control logic may change the voltage and/or clock(s) of the core(s) in response to a thermal change in the core(s), or a change in the amount of current being drawn by the core(s).

In one embodiment, for example, the power drawn by a core is reduced if the core is relatively idle for a period of time. In one embodiment, the power is reduced in the core by placing the core in a c3 state or some other power state.

Furthermore, in one embodiment the core is placed into a new power state without first detecting the power state of another core in the processor or system, or otherwise coordinating the change of power state with another core. Advantageously, at least one embodiment may enable each core to respond to power conditions and requirements on the core independently of other cores, such that each core may adjust its power consumption without regard to the power states of other cores.

In addition to the core logic, other circuits may be included in the processor, such as "un-core" logic. The un-core logic may include circuits to perform other functions besides those performed by the core, such as memory interface functions, digital signal processing functions, graphics functions, etc. In one embodiment, the power consumed by the un-core logic may be controlled in a similar manner as described in regard to the one or more cores. Furthermore, in some embodiments, in which the core and un-core logic have different voltage and/or clocking requirements, the power consumed by the core and un-core logic may be controled independently of each other, just as the power consumed by the cores may be controled independently of each other.

Figure 3:
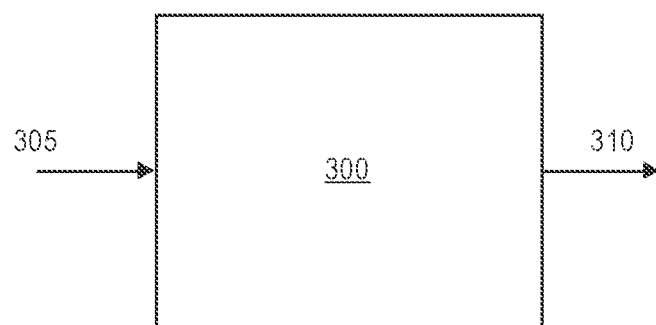
FIG. 3 illustrates power control logic according to one embodiment of the invention.

FIG. 3 illustrates power control logic, according to one embodiment, which may place a core or un-core logic, and corresponding outputs, into one of the power states illustrated in Table 1. The power control logic 300 includes at least one input 301 to detect at least one condition of a corresponding core or un-core logic. In one embodiment, the at least one condition may be a prescribed period of relative inactivity of the core or uncore, whereas in other embodiments, the condition may be a particular level of power consumption or thermal condition of the core or un-core logic. In other embodiments, other conditions or some combination of conditions may be detected by the power control logic or some other detection logic in order to indicate to the control logic whether to place the corresponding core or un-core logic into a different power state.

Power control logic 300 also includes an output 310 to control one or more PLLs responsible for delivering a clock signal to the corresponding core or un-core logic. Furthermore, the power control logic 300 may also include an output to control a voltage modification logic or circuit, such as one using one or more power transistors, voltage divider, or voltage transformation device. In other embodiments, the power control logic may include more inputs and/or more or fewer outputs. Furthermore, in one embodiment, the power control logic may be located within the same processor as the core it controls, whereas in other embodiments, it may be located outside of a processor containing a core it controls. In one embodiment, the power control logic may be implemented using hardware circuits, whereas in other embodiments, the power control logic may be implemented in software, or both hardware and software.

The power control logic may control the power of a core according to any number of logical operations, depending on the circumstances in which a core is to be power controlled. However, the power control logic may not require coordination with other control logic controlling the power of other cores, such that the power control logic may control the power of a core independently of the power state or power control of any other core or processing element. Advantageously, the power control logic may control the power consumption of a core (or number of cores) without detecting a power state of another core, or otherwise coordinating with other cores, such that power control of each core may be performed more efficiently than some prior art power control techniques.

Figure 4:
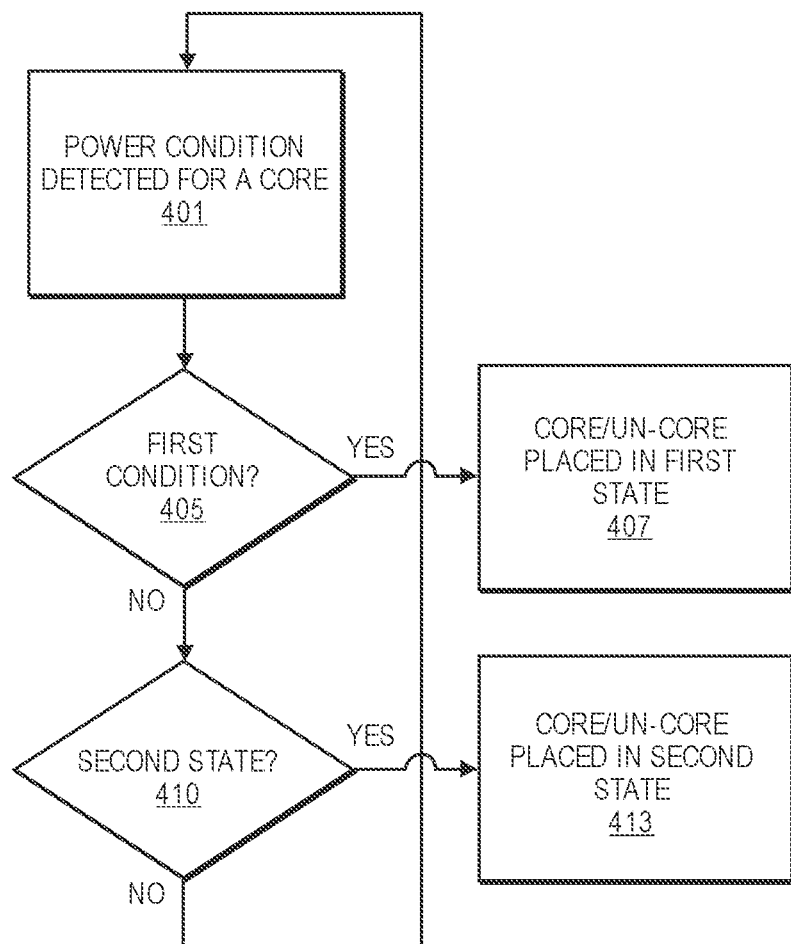
FIG. 4 is a flow diagram illustrating operations used in changing power states of at least one processing core according to one embodiment of the invention.

FIG. 4 is a flow diagram illustrating operations that may be performed according to one embodiment. For example, at operation 401, power control logic receives a signal to indicate some power-related condition of a core being power controlled by the power control logic. If the signal indicates a first condition at operation 405, the power control logic may place a core or un-core logic into a first power state at operation 407, such as an ACPI c3 state, whereas if a second condition is indicated by the signal at operation 410, the power control logic may place the core or un-core logic into a second power state at operation 413. In at least one embodiment, a number of cores may be power controlled according to at least the above operations independently of each other.

Figure 5:
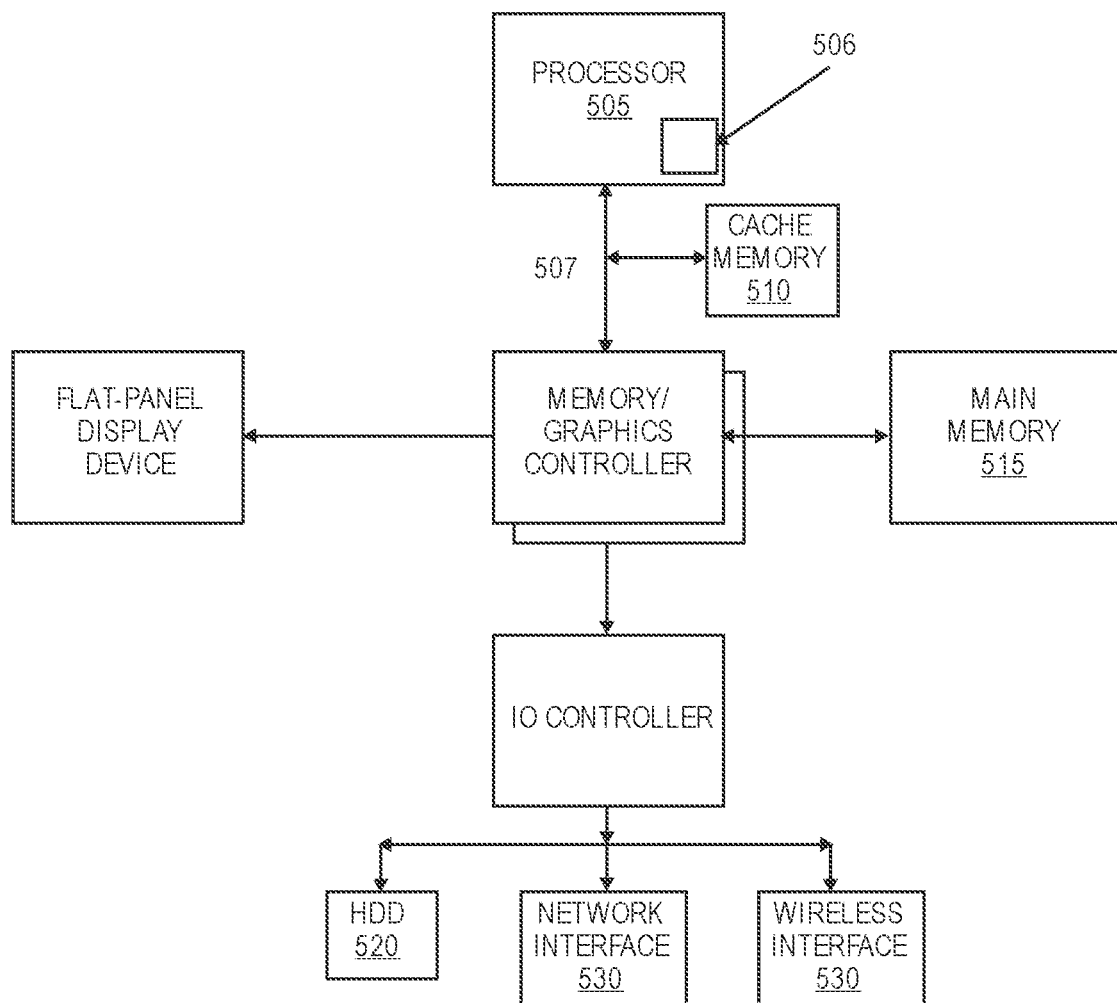
FIG. 5 illustrates a shared-bus computing system in which at least one embodiment of the invention may be used.

FIG. 5 illustrates a front-side-bus (FSB) computer system in which one embodiment of the invention may be used. A processor 505 accesses data from a level one (L1) cache memory 510 and main memory 515. In other embodiments of the invention, the cache memory may be a level two (L2) cache or other memory within a computer system memory hierarchy. Furthermore, in some embodiments, the computer system of FIG. 5 may contain both a L1 cache and an L2 cache.

The main memory may be implemented in various memory sources, such as dynamic random-access memory (DRAM), a hard disk drive (HDD) 520, or a memory source located remotely from the computer system via network interface 530 containing various storage devices and technologies. The cache memory may be located either within the processor or in close proximity to the processor, such as on the processor's local bus 507.

Figure 6:
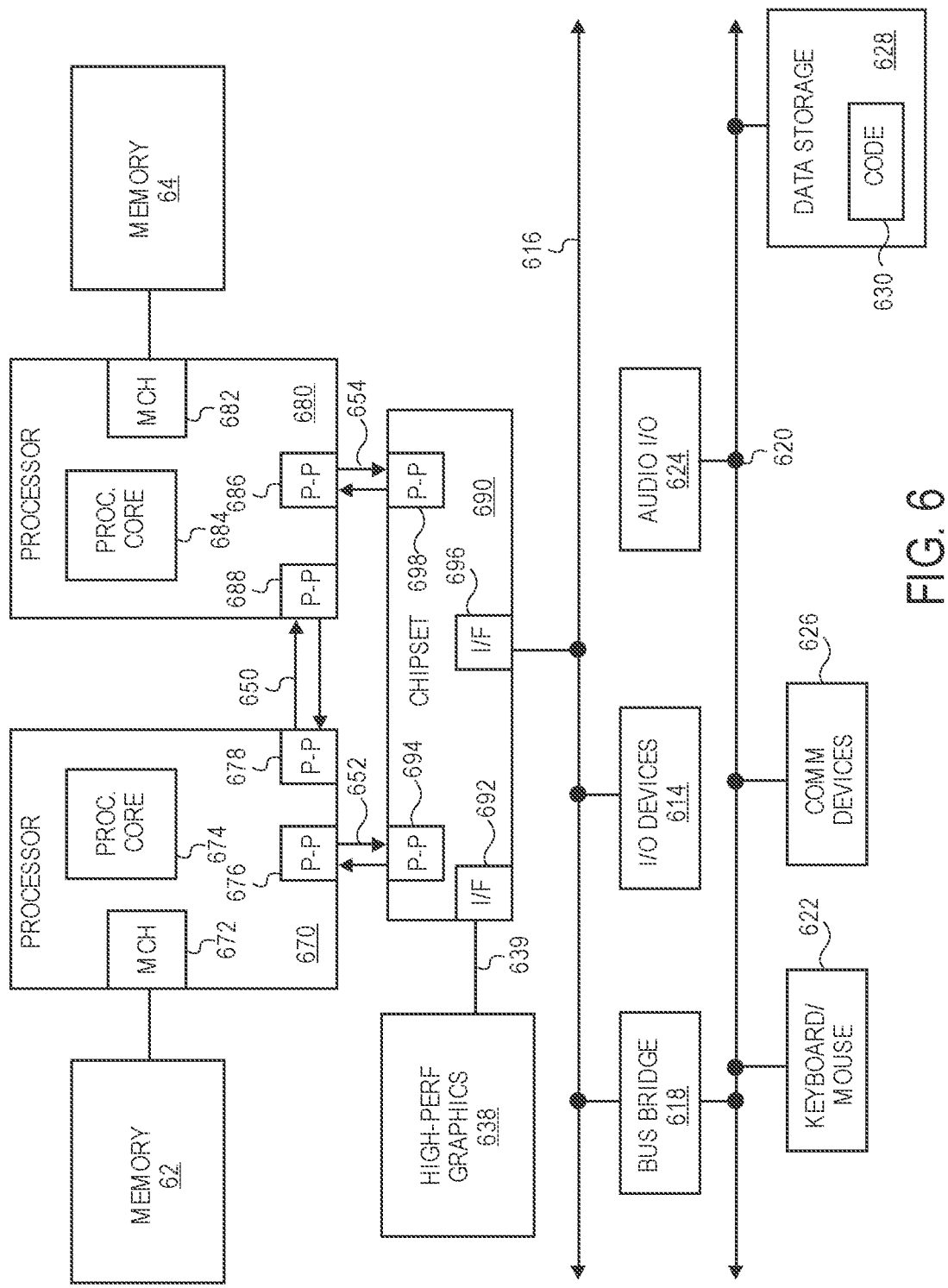
FIG. 6 illustrates a point-to-point computing system in which at least one embodiment of the invention may be used.

Furthermore, the cache memory may contain relatively fast memory cells, such as a six-transistor (6T) cell, or other memory cell of approximately equal or faster access speed. The computer system of FIG. 5 may be a point-to-point (PtP) network of bus agents, such as microprocessors, that communicate via bus signals dedicated to each agent on the PtP network. FIG. 6 illustrates a computer system that is arranged in a point-to-point (PtP) configuration. In particular, FIG. 6 shows a system where processors, memory, and input/output devices are interconnected by a number of point-to-point interfaces.

The system of FIG. 6 may also include several processors, of which only two, processors 670, 680 are shown for clarity. Processors 670, 680 may each include a local memory controller hub (MCH) 672, 682 to connect with memory 22, 24. Processors 670, 680 may exchange data via a point-to-point (PtP) interface 650 using PtP interface circuits 678, 688. Processors 670, 680 may each exchange data with a chipset 690 via individual PtP interfaces 652, 654 using point to point interface circuits 676, 694, 686, 698. Chipset 690 may also exchange data with a high-performance graphics circuit 638 via a high-performance graphics interface 639. Embodiments of the invention may be located within any processor having any number of processing cores, or within each of the PtP bus agents of FIG. 6.

Other embodiments of the invention, however, may exist in other circuits, logic units, or devices within the system of FIG. 6. Furthermore, in other embodiments of the invention may be distributed throughout several circuits, logic units, or devices illustrated in FIG. 6.

Processors referred to herein, or any other component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these mediums may "carry" or "indicate" the design, or other information used in an embodiment of the present invention, such as the instructions in an error recovery routine. When an electrical carrier wave indicating or carrying the information is transmitted, to the extent that copying, buffering, or re-transmission of the electrical signal is performed, a new copy is made. Thus, the actions of a communication provider or a network provider may be making copies of an article, e.g., a carrier wave, embodying techniques of the present invention.

Thus, techniques for steering memory accesses, such as loads or stores are disclosed. While certain embodiments have been described, and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

Various aspects of one or more embodiments of the invention may be described, discussed, or otherwise referred to in an advertisement for a processor or computer system in which one or more embodiments of the invention may be used. Such advertisements may include, but are not limited to news print, magazines, billboards, or other paper or otherwise tangible media. In particular, various aspects of one or more embodiments of the invention may be advertised on the internet via websites, "pop-up" advertisements, or other web-based media, whether or not a server hosting the program to generate the website or pop-up is located in the United States of America or its territories.

What is claimed is:
1. A processor comprising:
a plurality of cores, each of the cores including an instruction processing pipeline with a decoder to decode instructions and out-of-order execution circuitry to perform out-of-order execution of the instructions;
an uncore circuit coupled to the plurality of cores;
detection circuitry to detect one or more conditions associated with the plurality of cores and the uncore circuit, the one or more conditions including thermal conditions and conditions related to workload;
power control circuitry comprising:
a plurality of phase locked loop (PLL) circuits, responsive to the one or more conditions, to deliver separate clock signals to the uncore circuit, a first subset of one or more of the plurality of cores, and a second subset of one or more of the plurality of cores,
wherein responsive to the separate clock signals, the uncore circuit, the first subset, and the second subset, respectively, are to operate at separate frequencies;
voltage control circuitry including at least one charge pump, the voltage control circuitry, responsive to the one or more conditions, to deliver separate voltages to the uncore circuit, the first subset, and the second subset.

2. The processor of claim 1, wherein the separate frequencies include a first frequency to be applied to the first subset, a second frequency to be applied to the second subset, and a third frequency to be applied to the uncore circuit.

3. The processor of claim 2, further comprising:
a first PLL to deliver a first clock signal at the first frequency, a second PLL to deliver a second clock signal at the second frequency and a third PLL to deliver a third clock signal at the third frequency.

4. The processor of claim 1, wherein the separate voltages comprise a first voltage to be applied to the first subset, a second voltage to be applied to the second subset, and a third voltage to be applied to the uncore circuit.

5. The processor of claim 1, wherein the separate frequencies include a first frequency to be applied to the first subset, a second frequency to be applied to the second subset, and a third frequency to be applied to the uncore circuit, the processor further comprising:
a first PLL to deliver a first clock signal at the first frequency, a second PLL to deliver a second clock signal at the second frequency and a third PLL to deliver a third clock signal at the third frequency, wherein the separate voltages comprise a first voltage to be applied to the first subset, a second voltage to be applied to the second subset, and a third voltage to be applied to the uncore circuit.

6. The processor of claim 1, further comprising:
an instruction fetch circuit to fetch the instructions.

7. The processor of claim 1, further comprising:
a cache coupled to the plurality of cores.

8. The processor of claim 7, wherein the uncore circuit includes the cache.

9. The processor of claim 1, further comprising:
a plurality of reservation stations, each reservation station integral to one of the plurality of cores.

10. The processor of claim 1, further comprising:
a plurality of re-order buffers, each re-order buffer integral to one of the plurality of cores.

11. The processor of claim 1, further comprising:
one or more output circuits to drive data onto one or more buses.

12. A method comprising:
detecting, in detection circuitry of a processor having a plurality of cores, each of the cores including an instruction processing pipeline with a decoder to decode instructions and out-of-order execution circuitry to perform out-of-order execution of the instructions, the processor further including an uncore circuit coupled to the plurality of cores, one or more conditions associated with the plurality of cores and the uncore circuit, the one or more conditions including thermal conditions and conditions related to workload;
delivering, via a plurality of phase locked loop (PLL) circuits, responsive to the one or more conditions, separate clock signals to the uncore circuit, a first subset of one or more of the plurality of cores, and a second subset of one or more of the plurality of cores, wherein responsive to the separate clock signals, the uncore circuit, the first subset, and the second subset, respectively, are to operate at separate frequencies; and
delivering, via voltage control circuitry including at least one charge pump, responsive to the one or more conditions, separate voltages to the uncore circuit, the first subset, and the second subset.

13. The method of claim 12, further comprising delivering the separate clock signal at the separate frequencies including a first frequency to be applied to the first subset, a second frequency to be applied to the second subset, and a third frequency to be applied to the uncore circuit.

14. The method of claim 13, further comprising delivering a first clock signal at the first frequency via a first PLL, delivering a second clock signal at the second frequency via a second PLL and delivering a third clock signal at the third frequency via a third PLL.

15. The method of claim 12, further comprising delivering a first voltage to be applied to the first subset, a second voltage to be applied to the second subset, and a third voltage to be applied to the uncore circuit.

16. A non-transitory machine-readable medium having stored thereon instructions, which if performed by a machine cause the machine to perform a method comprising:
detecting, in detection circuitry of a processor having a plurality of cores, each of the cores including an instruction processing pipeline with a decoder to decode instructions and out-of-order execution circuitry to perform out-of-order execution of the instructions, the processor further including an uncore circuit coupled to the plurality of cores, one or more conditions associated with the plurality of cores and the uncore circuit, the one or more conditions including thermal conditions and conditions related to workload;
delivering, via a plurality of phase locked loop (PLL) circuits, responsive to the one or more conditions, separate clock signals to the uncore circuit, a first subset of one or more of the plurality of cores, and a second subset of one or more of the plurality of cores, wherein responsive to the separate clock signals, the uncore circuit, the first subset, and the second subset, respectively, are to operate at separate frequencies; and
delivering, via voltage control circuitry including at least one charge pump, responsive to the one or more conditions, separate voltages to the uncore circuit, the first subset, and the second subset.

17. The non-transitory machine-readable medium of claim 16, wherein the method further comprises delivering the separate clock signal at the separate frequencies including a first frequency to be applied to the first subset, a second frequency to be applied to the second subset, and a third frequency to be applied to the uncore circuit.

18. The non-transitory machine-readable medium of claim 17, wherein the method further comprises delivering a first clock signal at the first frequency via a first PLL, delivering a second clock signal at the second frequency via a second PLL and delivering a third clock signal at the third frequency via a third PLL.

19. The non-transitory machine-readable medium of claim 16, wherein the method further comprises delivering a first voltage to be applied to the first subset, a second voltage to be applied to the second subset, and a third voltage to be applied to the uncore circuit.

20. The non-transitory machine-readable medium of claim 16, wherein the machine-readable medium further comprises data that represents a design of an integrated circuit comprising the processor.

* * * * *